United States Patent
Ejzak et al.

(10) Patent No.: US 8,218,462 B2
(45) Date of Patent: Jul. 10, 2012

(54) MOBILE COMMUNICATION DEVICE RECEIPT THROUGH SECOND TELECOMMUNICATION NETWORK OF CALL DIRECTED TO REGISTRATION IN FIRST TELECOMMUNICATION NETWORK

(75) Inventors: Richard P. Ejzak, Wheaton, IL (US); Ruth Schaefer Gayde, Naperville, IL (US); Michael J. Rudolph, Naperville, IL (US)

(73) Assignee: Alcatel Lucent, Paris (FR)

( * ) Notice: Subject to any disclaimer, the term of this patent is extended or adjusted under 35 U.S.C. 154(b) by 1011 days.

(21) Appl. No.: 11/084,281

(22) Filed: Mar. 18, 2005

(65) Prior Publication Data
US 2006/0211423 A1 Sep. 21, 2006

(51) Int. Cl.
*H04B 7/00* (2006.01)
*H04W 4/00* (2009.01)
*H04L 12/66* (2006.01)
*H04L 12/28* (2006.01)
*H04W 40/00* (2009.01)

(52) U.S. Cl. ........ 370/310; 370/352; 370/401; 455/445; 455/435.1; 455/433

(58) Field of Classification Search .......... 370/351, 370/356, 352, 401, 349, 466; 455/445, 435.1, 455/433
See application file for complete search history.

(56) References Cited

U.S. PATENT DOCUMENTS

| | | | | |
|---|---|---|---|---|
| 6,622,016 | B1* | 9/2003 | Sladek et al. | 455/414.1 |
| 7,450,565 | B2* | 11/2008 | Suotula et al. | 370/352 |
| 7,620,391 | B2* | 11/2009 | Itzkovitz et al. | 455/416 |
| 2001/0016039 | A1* | 8/2001 | Slutsman et al. | 379/221.13 |
| 2003/0137991 | A1* | 7/2003 | Doshi et al. | 370/466 |
| 2004/0162068 | A1* | 8/2004 | Lamb et al. | 455/432.1 |
| 2004/0184435 | A1* | 9/2004 | Westman | 370/349 |
| 2004/0242227 | A1* | 12/2004 | Huotari et al. | 455/432.1 |
| 2006/0079236 | A1* | 4/2006 | Del Pino et al. | 455/445 |

* cited by examiner

*Primary Examiner* — George Eng
*Assistant Examiner* — Muthuswamy Manoharan
(74) *Attorney, Agent, or Firm* — Carmen Patti Law Group, LLC

(57) ABSTRACT

A network infrastructure device of an apparatus in one example comprises a first external interface and a second external interface. The network infrastructure device communicates with a first telecommunication network through the first external interface. The network infrastructure device communicates with a second telecommunication network through the second external interface. The network infrastructure device allows a mobile communication device that has a first registration in the first telecommunication network and a second registration in the second telecommunication network to receive, through the second telecommunication network, a call directed to the first registration. The first telecommunication network is unable to directly query the second telecommunication network for a status of the second registration.

14 Claims, 4 Drawing Sheets

MOBILE COMMUNICATION DEVICE RECEIPT THROUGH SECOND TELECOMMUNICATION NETWORK OF CALL DIRECTED TO REGISTRATION IN FIRST TELECOMMUNICATION NETWORK

TECHNICAL FIELD

The invention relates generally to telecommunication and more particularly to call delivery in telecommunication networks.

BACKGROUND

In known telecommunication systems, mobile service providers employ legacy cellular networks that co-exist with Internet Protocol Multimedia Subsystem ("IMS") networks. In one exemplary legacy cellular network, a home location register maintains a first registration for a subscriber's mobile communication device. In an area where an IMS network co-exists with the legacy cellular network, the mobile communication device may comprise a second registration in the IMS network at the same time. Where the first registration and the second registration are associated with a single dialed number for the mobile communication device, some calls may be initially delivered through the legacy cellular network. If the subscriber prefers to receive calls through the IMS network when possible, calls must be redirected from the legacy cellular network to the IMS network.

The legacy cellular network employs an ANSI-41 protocol as a mechanism to locate subscribers. The IMS network employs a DIAMETER protocol as a mechanism to locate subscribers. To redirect the call from the legacy cellular network into the IMS network, the legacy cellular network must determine a status of the second registration, for example, "registered" or "unregistered," to determine if the redirect of the call is possible. Since the legacy cellular network and the IMS network employ different protocols to locate subscribers, the legacy cellular network is unable to query the IMS network for the status of the second registration without modification to both the legacy cellular network and the IMS network. Modification of the legacy cellular network and the IMS network incurs additional costs to the mobile service providers.

Thus, a need exists for call delivery for a mobile communication device from a first telecommunication network to a second telecommunication network without modification of the first telecommunication network and/or the second telecommunication network when the mobile communication device is registered in both the first telecommunication network and the second telecommunication network.

SUMMARY

A mobile communication device is registered in both a first telecommunication network and a second telecommunication network. A call delivery to the mobile communication device from the first telecommunication network to the second telecommunication network is performed without modification of the first telecommunication network and/or the second telecommunication network.

In one embodiment, there is provided an apparatus comprising network infrastructure device. The network infrastructure device comprises a first external interface and a second external interface. The network infrastructure device communicates with a first telecommunication network through the first external interface. The network infrastructure device communicates with a second telecommunication network through the second external interface. The network infrastructure device allows a mobile communication device that has a first registration in the first telecommunication network and a second registration in the second telecommunication network to receive, through the second telecommunication network, a call directed to the first registration. The first telecommunication network is unable to directly query the second telecommunication network for a status of the second registration.

In another embodiment, there is provided a method for receiving a query message, for a call to a mobile communication device, from a first telecommunication network through employment of a first network protocol. A registration status of the mobile communication device in a second telecommunication network is determined through employment of a second network protocol to allow for a call delivery of the call through the second telecommunication network, wherein the first telecommunication network is unable to directly query the second telecommunication network for the registration status.

In yet another embodiment, there is provided a method for receiving, at a service control point component, a first query message from a mobile switching center of a legacy cellular network through employment of a legacy network protocol of the legacy cellular network, wherein the first query message comprises a dialed number associated with a call to a mobile communication device that is registered in the legacy cellular network. A second query message that comprises the dialed number is sent from the service control point component to an application server component. An existence of a recent failure flag associated with the dialed number is checked at the application server component upon receipt of the second query message. A temporary routing number is checked for availability by the application server component. A continue message is sent from the application server component to the mobile switching center of the legacy cellular network through the service control point component if the recent failure flag exists or the temporary routing number is not available, to cause a routing of the call through the legacy cellular network. A call delivery of the call to the mobile communication device through an Internet Protocol Multimedia Subsystem network is performed at the application server component if the recent failure flag does not exist and the temporary routing number is available.

DESCRIPTION OF THE DRAWINGS

Features of exemplary implementations of the invention will become apparent from the description, the claims, and the accompanying drawings in which:

DETAILED DESCRIPTION

Figure 1:
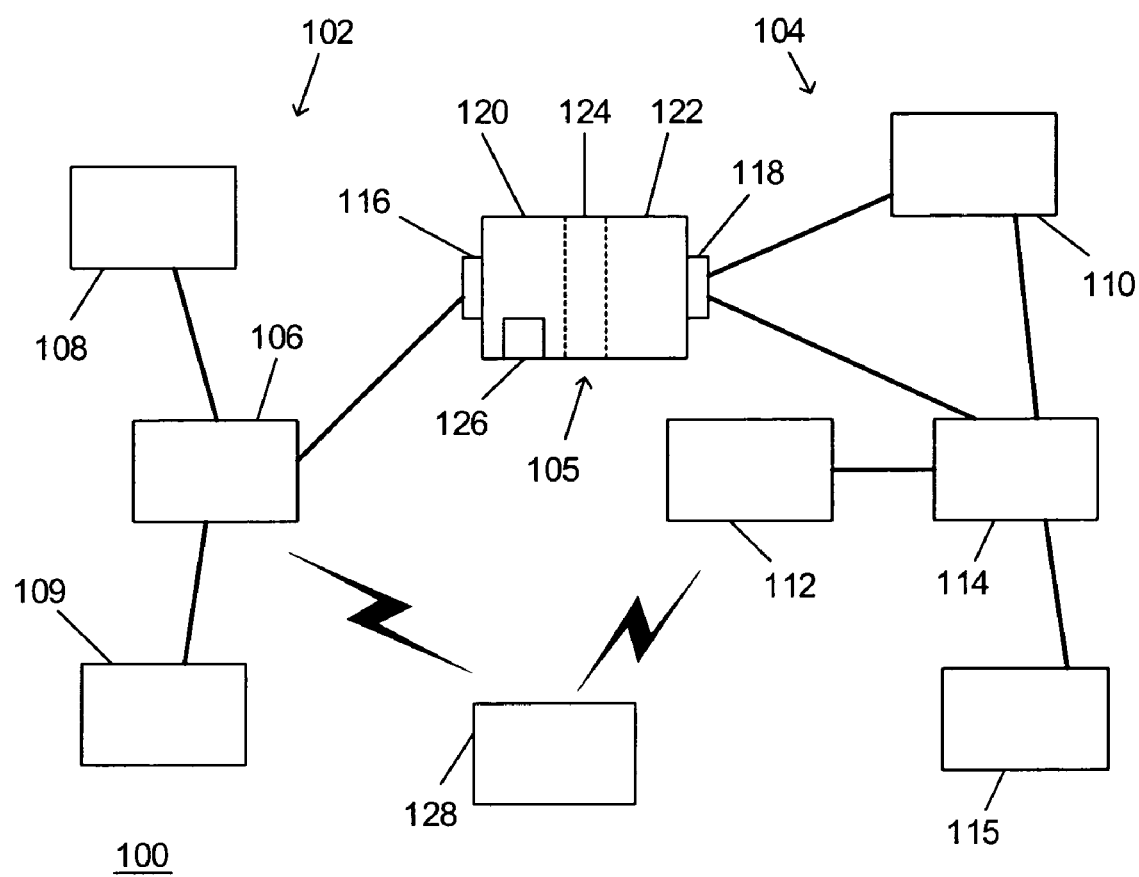
FIG. 1 is a representation of one implementation of an apparatus that comprises a first telecommunication network, a second telecommunication network, and a network infrastructure device.

Turning to FIG. 1, an apparatus 100 in one embodiment comprises a first telecommunication network 102, a second telecommunication network 104, and a network infrastructure device 105. The first telecommunication network 102 comprises a legacy cellular network, for example, a code division multiple access ("CDMA"), time division multiple access ("TDMA"), global system for mobile communication ("GSM"), or universal mobile telecommunications system ("UMTS") network that employs a circuit-switched communication protocol, such as ANSI-41 or mobile application part ("MAP"). The first telecommunication network 102 comprises a mobile switching center 106, a home location register 108, and a serving mobile switching center 109. The second telecommunication network 104 in one example comprises a packet-switched network, for example, an Internet Protocol Multimedia Subsystem (IMS) network. The second telecommunication network 104 comprises a home subscriber server (HSS) 110, a media gateway control function (MGCF) 112, an interrogating call session control function (I-CSCF) 114, and a serving call session control function (S-CSCF) 115. The second telecommunication network 104 in one example employs a session initiation protocol (SIP) communication protocol (RFC 2543, Internet Engineering Task Force, http://www.ietf.org) and a DIAMETER protocol (RFC 3588, Internet Engineering Task Force, http://www.ietf.org).

The network infrastructure device 105 in one embodiment comprises a first external interface 116, second external interface 118, a service control point component 120, an application server component 122, and an internal interface 124. In a further example, the network infrastructure device 105 comprises an instance of a recordable data storage medium 126, as described herein. The first external interface 116 is communicatively coupled with the first telecommunication network 102. The second external interface 118 is communicatively coupled with the second telecommunication network 104. The network infrastructure device 105 supports a plurality of network interface protocols to allow communication with both the first telecommunication network 102 and the second telecommunication network 104. For example, the network infrastructure device 105 supports the ANSI-41 communication protocol through the first external interface 116 and the SIP communication protocol and DIAMETER protocol through the second external interface 118. The first external interface 116 and the second external interface 118 in one example comprise logical interfaces. For example, the network infrastructure device 105 comprises one or more software applications and the first external interface 116 and the second external interface 118 comprise software interfaces or application programming interfaces ("APIs"), as will be appreciated by those skilled in the art.

The service control point component 120 of the network infrastructure device 105 communicates with the first telecommunication network 102 through the first external interface 116. For example, the service control point component 120 emulates a service control point of the first telecommunication network 102. The application server component 122 of the network infrastructure device 105 communicates with the second telecommunication network 104 through the second external interface 118. For example, the application server component 122 emulates an application server of the second telecommunication network 104. The service control point component 120 and the application server component 122 communicate with each other through the internal interface 124. The service control point component 120 and the application server component 122 in one example comprise software applications running on one or more network servers. The internal interface 124 in one example employs a lightweight directory access protocol ("LDAP") communication protocol and/or an authentication, authorization, and accounting ("AAA") communication protocol, for example, DIAMETER. In one embodiment, communication between the service control point component 120 and the application server component 122 is not employed by the first telecommunication network 102 or the second telecommunication network 104. Thus, the communication protocol of the internal interface 124 in one example comprises a proprietary or customized communication protocol, as will be appreciated by those skilled in the art.

The first telecommunication network 102 comprises a first registration associated with a mobile communication device 128. The second telecommunication network 104 comprises a second registration associated with the mobile communication device. Both the first registration and the second registration are associated with a single dialed number for the mobile communication device. The first telecommunication network 102 in one example employs the ANSI-41 protocol as a mechanism to locate subscribers. The second telecommunication network 104 employs the DIAMETER protocol as a mechanism to locate subscribers. To redirect a call from the first telecommunication network 102 into the second telecommunication network 104, the first telecommunication network 102 must determine a status of the second registration, for example, "registered" or "unregistered," to determine if the redirect of the call is possible. Since the first telecommunication network 102 and the second telecommunication network 104 employ different protocols to locate subscribers, the first telecommunication network 102 is unable to directly query the second telecommunication network 104 for the status of the second registration without modification to both the legacy cellular network and the IMS network.

The network infrastructure device 105 in one embodiment provides for an interface from the first telecommunication network 102 to the second telecommunication network 104. When a call to the dialed number is routed to the mobile switching center 106, the network infrastructure device 105 allows the mobile communication device to receive the call through the second telecommunication network 104 without modification to the first telecommunication network 102 or the second telecommunication network 104. The network infrastructure device 105 in one example queries the second telecommunication network 104 on behalf of the first telecommunication network 102 to determine if the call may be delivered through the second telecommunication network 104. For example, the network infrastructure device 105 determines a status of the second registration in the second telecommunication network 104.

Figure 2:
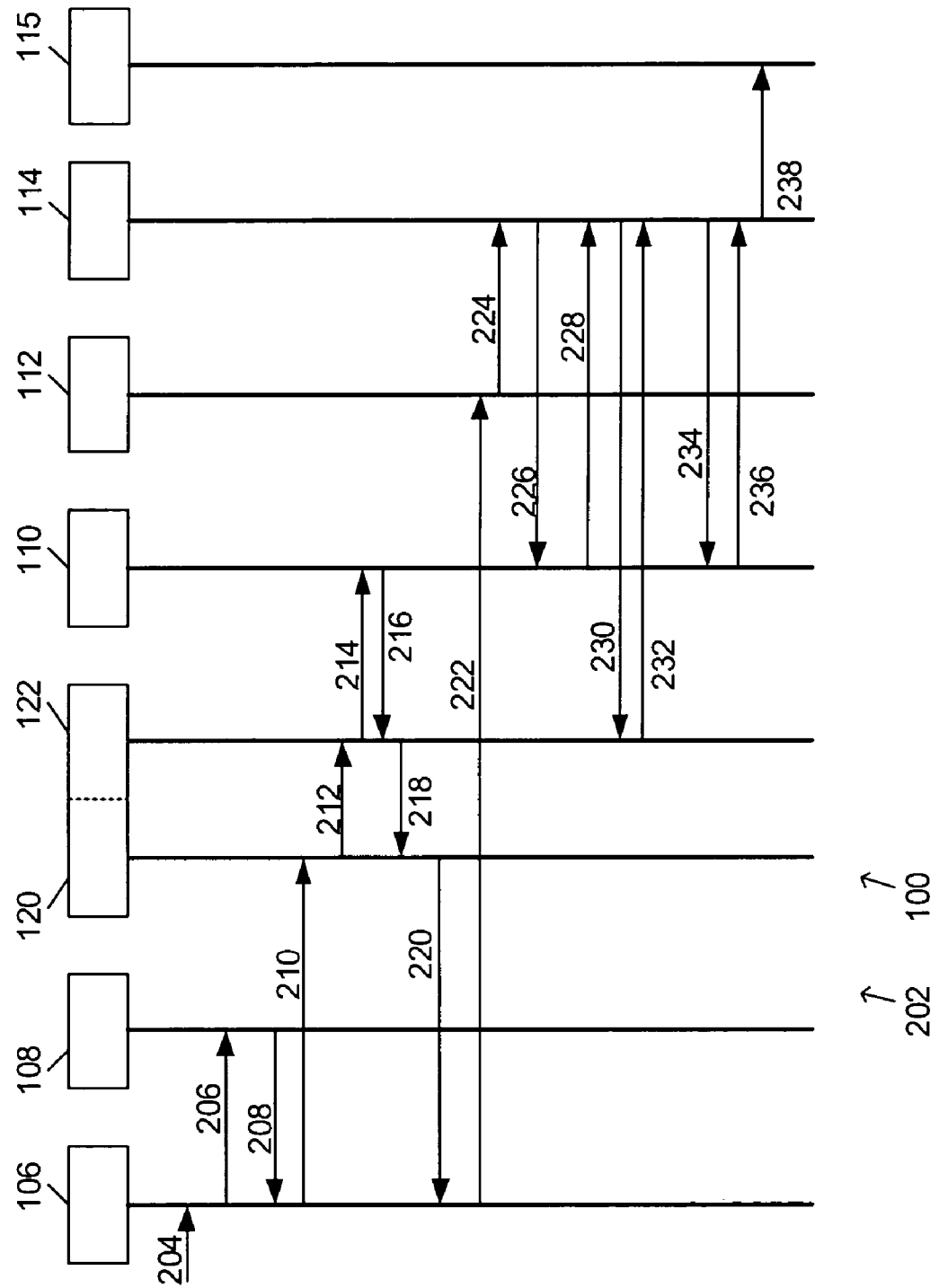
FIG. 2 is a representation of one exemplary message flow for a call delivery from the first telecommunication network into the second telecommunication network by the network infrastructure device of the apparatus of FIG. 1.

An illustrative description of exemplary operation of the apparatus 100 is presented, for explanatory purposes. Turning to FIG. 2, a message flow 202 illustrates an exemplary call delivery from the first telecommunication network 102 into the second telecommunication network 104 by the network infrastructure device 105. The call delivery in one example comprises a call forward from the first telecommunication network 102 to the second telecommunication network 104. A home mobile switching center of the mobile communication device 128, for example, the mobile switching center 106, receives a call request message 204 for the mobile communication device. The call request message 204 in one example comprises an initial address message ("IAM") of the integrated services digital network user part ("ISUP") protocol. The call request message 204 comprises an identifier for the first registration, for example, the dialed number and/or mobile directory number associated with the first registration of the mobile communication device. The mobile switching center 106 sends a query message 206, for example, a location request message with mobile termination trigger type, with the identifier to the home location register 108. The home location register 108 has been pre-provisioned with an advanced termination trigger associated with the first registration. Upon receipt of the query message 206, the home location register 108 performs a lookup with the identifier and obtains the advanced termination trigger and an address of the service control point component 120. The home location register 108 sends a trigger address message 208 that comprises the advanced termination trigger and the address of the service control point component 120 to the mobile switching center 106, as will be understood by those skilled in the art.

Upon receipt of the trigger address message 208, the mobile switching center 106 sends a query message 210 with the identifier to the service control point component 120. The query message 210 in one example comprises an analyze digits message with the identifier of the mobile communication device. The service control point component 120 receives the query message 210 from the mobile switching center 106 through the external interface 116. The service control point component 120 sends a query message 212 that comprises the dialed number to the application server component 122 through the internal interface 124.

Upon receipt of the query message 212, the application server component 122 checks for an existence of a recent failure flag associated with the second registration, as described herein. The application server component 122 sends a query message 214 to the home subscriber server 110 of the second telecommunication network 104 to request a status of the second registration, for example, "registered" or "unregistered." The query message 214 in one example comprises a user data request of the DIAMETER communication protocol. The home subscriber server 110 replies to the query message 214 with the status of the second registration, for example, in a user data acknowledgement message 216.

If the status of the second registration is active, for example, the mobile communication device is "registered" in the second telecommunication network 104, the application server component 122 allocates a temporary routing number from a pool of temporary routing numbers. The temporary routing numbers comprise routable telephone numbers associated with the application server component 122. In a further example, the temporary routing numbers comprise public service identities associated with the application server component 122. The application server component 122 associates the temporary routing number with the second registration, for example, with a public user ID of the mobile communication device. The application server component 122 sends the temporary routing number to the service control point component 120 in a message 218. In one example, the application server component 122 fails to allocate a temporary routing number for the mobile communication device. For example, the pool of temporary routing numbers is empty and a temporary routing number is not available. The application server component 122 then sends a continue message 314 (FIG. 3) to cancel the call delivery into the second telecommunication network 104, as described herein. In one example, the application server component 122 checks for the availability of a temporary routing number before sending the query message 214.

Upon receipt of the temporary routing number in the message 218, the service control point component 120 sends a reply message 220 to the query message 210. The reply message 220 comprises the temporary routing number. The mobile switching center 106 receives the reply message 220 and attempts call delivery to the temporary routing number. For example, the mobile switching center 106 sends a call request message 222 to the media gateway control function 112 of the second telecommunication network 104. The call request message 222 in one example comprises an initial address message with the temporary routing number.

The media gateway control function 112 determines that the call request should be passed to the interrogating call session control function 114 based on the temporary routing number. The media gateway control function 112 sends an invite message 224 to the interrogating call session control function 114. The invite message 224 in one example comprises a SIP invite message with the temporary routing number. The interrogating call session control function 114 sends a query message 226 with the temporary routing number to the home subscriber server 110 to obtain an address of an application server that will handle the call request. The query message 226 in one example comprises a Location Information Request message of the DIAMETER protocol. The home subscriber server 110 has been pre-provisioned to associate the temporary routing number with an address of the application server component 122. The home subscriber server 110 responds to the query message 226 with a response message 228 that comprises the address of the application server component 122. The response message 228 in one example comprises the Location Information Answer message of the DIAMETER protocol.

Upon receipt of the response message 228 with the address of the application server component 122, the interrogating call session control function 114 sends an invite message 230, for example, a SIP invite message, to the application server component 122. The invite message 230 comprises the temporary routing number. The application server component 122 sends the public user ID associated with the temporary routing number to the interrogating call session control function 114 in an invite message 232. The invite message 232 in one example comprises a SIP invite message. Upon sending the public user ID to the interrogating call session control function 114, the application server component 122 releases the temporary routing number back into the pool of temporary routing numbers, as will be appreciated by those skilled in the art.

The interrogating call session control function 114 sends a query message 234 to the home subscriber server 110 to obtain an address of the serving call session control function 115 associated with the mobile communication device. The query message 234 in one example comprises a Location Information Request of the DIAMETER protocol. The home subscriber server 110 sends a response message 236 that comprises the address of the serving call session control function 115. The response message 236 in one example comprises a Location Information Answer of the DIAMETER protocol. The interrogating call session control function sends a call request message 238 that comprises the public user ID of the mobile communication device to the serving call session control function 115 to continue the call delivery to the mobile communication device, as will be appreciated by those skilled in the art.

The network infrastructure device 105 in one embodiment allows the call delivery from the first telecommunication network 102 to the second telecommunication network 104 without modification to the mobile switching center 106 and home location register 108 of the first telecommunication network 102 or the home subscriber server 110, media gateway control function 112, and interrogating call session control function 114 of the second telecommunication network 104. For example, each of the messages 204, 206, 208, 210, 214, 216, 220, 222, 224, 226, 228, 230, 232, 234, 236, and 238 is compliant with the respective network protocols of the telecommunication network 102 and 104, as will be appreciated by those skilled in the art.

Figure 3:
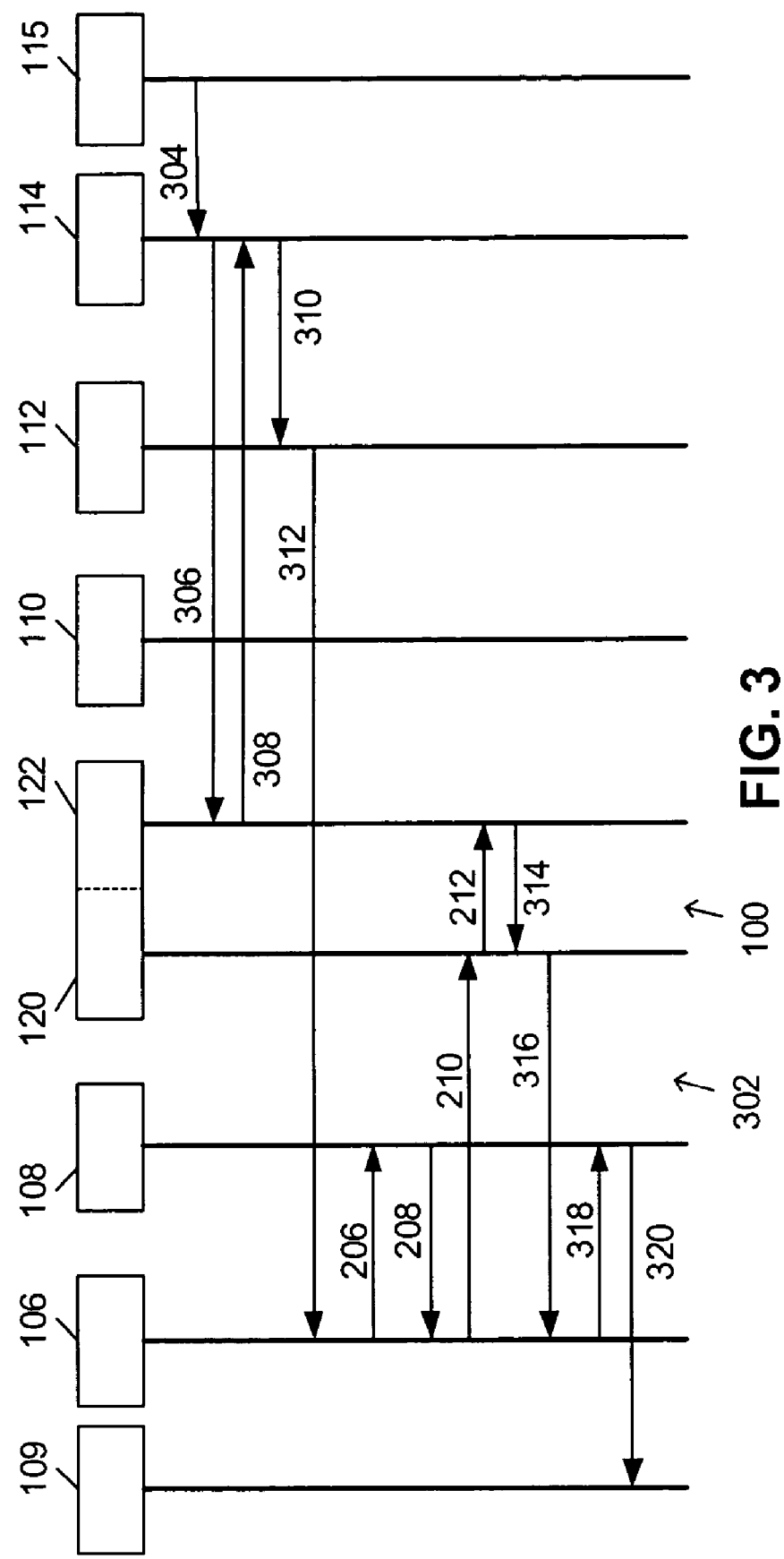
FIG. 3 is a representation of one exemplary message flow for a failed call delivery from the first telecommunication network into the second telecommunication network by the network infrastructure device of the apparatus of FIG. 1.

Turning to FIG. 3, a message flow 302 illustrates an exemplary failed call delivery from the first telecommunication network 102 into the second telecommunication network 104 by the network infrastructure device 105. In one example, after the interrogating call session control function 114 has sent the call request message 238 to the serving call session control function 115, the call delivery fails. Exemplary causes for a failure of the call delivery comprise: the second registration is no longer active; a user of the mobile communication device does not answer the call; or the mobile communication device loses reception, as will be appreciated by those skilled in the art.

Upon failure of the call delivery to the mobile communication device, the serving call session control function 115 sends a failure message 304 to the interrogating call session control function 114. The failure message 304 comprises the public user ID of the mobile communication device. The interrogating call session control function 114 sends a failure message 306 with the public user ID to the application server component 122 to indicate the failure of the call delivery. The application server component 122 sets a recent failure flag associated with the second registration, for example, the public user ID, to indicate the failure of the call delivery through the second telecommunication network 104. In another example, the application server component 122 sets the recent failure flag if a timeout occurs while waiting for a response to the invite message 232, for example, either a failure message 306 or a success message.

After setting the recent failure flag, the application server component 122 sends a redirect message 308 with the dialed number of the mobile communication device to the interrogating call session control function 114. The redirect message 308 in one example comprises a SIP 302 response message. The interrogating call session control function 114 sends a redirect message 310 to a media gateway control function, for example, the media gateway control function 112 that previously attempted delivery of the call. The media gateway control function 112 sends a call request message 312 into the first telecommunication network 102. For example, the media gateway control function 112 sends an IAM message to the mobile switching center 106 associated with the dialed number of the mobile communication device.

The mobile switching center 106 handles the call request 312 in a similar manner to the call request message 204. The corresponding messages 206, 208, 210, and 212 are generated as described above. Upon receipt of the query message 212, the application server component 122 checks for the existence of the recent failure flag associated with the second registration. Since the recent failure flag exists, the application server component 122 sends a continue message 314 to the service control point component 120. The service control point component 120 sends a reply message 316 to the query message 210. The reply message 316 comprises a "continue" message.

Upon receipt of the continue message, the mobile switching center 106 sends a query message 318 to the home location register 108 to route the call in the first communication network 102. The query message 318 in one example comprises a location request message with a location trigger type. The home location register 108 sends a route request message 320 to the serving mobile switching center 109 associated with the first registration of the mobile communication device 128 in the first telecommunication network 102. The first telecommunication network 102 performs the call delivery as a normal call. In one embodiment, each of the messages 206, 208, 210, 304, 306, 308, 310, 312, 316, 318, and 320 is compliant with the respective network protocols of the telecommunication network 102 and 104. For example, no modification is needed to the mobile switching center 106 and home location register 108 of the first telecommunication network 102 or the home subscriber server 110, media gateway control function 112, and interrogating call session control function 114 of the second telecommunication network 104, as will be appreciated by those skilled in the art.

After the recent failure flag has been set, the application server component 122 must clear the recent failure flag to allow attempted delivery of later calls into the second telecommunication network 104. In one example, the application server component 122 clears the recent failure flag after a pre-determined time interval, for example, ten seconds. In another example, the application server component 122 clears the recent failure flag upon an event, for example, a notification of subscriber activity in the second telecommunication network 104, such as receipt of a SIP NOTIFY message. In a further example, the application server component 122 starts a timer upon an event and clears the flag upon expiration of the timer. In yet another example, the application server component 122 performs periodic polls to the mobile communication device through the second telecommunication network 104, for example, use of the OPTIONS request message as described above. The duration of the recent failure flag must be long enough to avoid sending the call into an infinite loop. An infinite loop in one example could occur if the media gateway control function 112 redirects a call back to the mobile switching center 106 of the first telecommunication network 102, and the mobile switching center 106 then redirects the same call back to the second telecommunication network 104, as will be appreciated by those skilled in the art.

Figure 4:
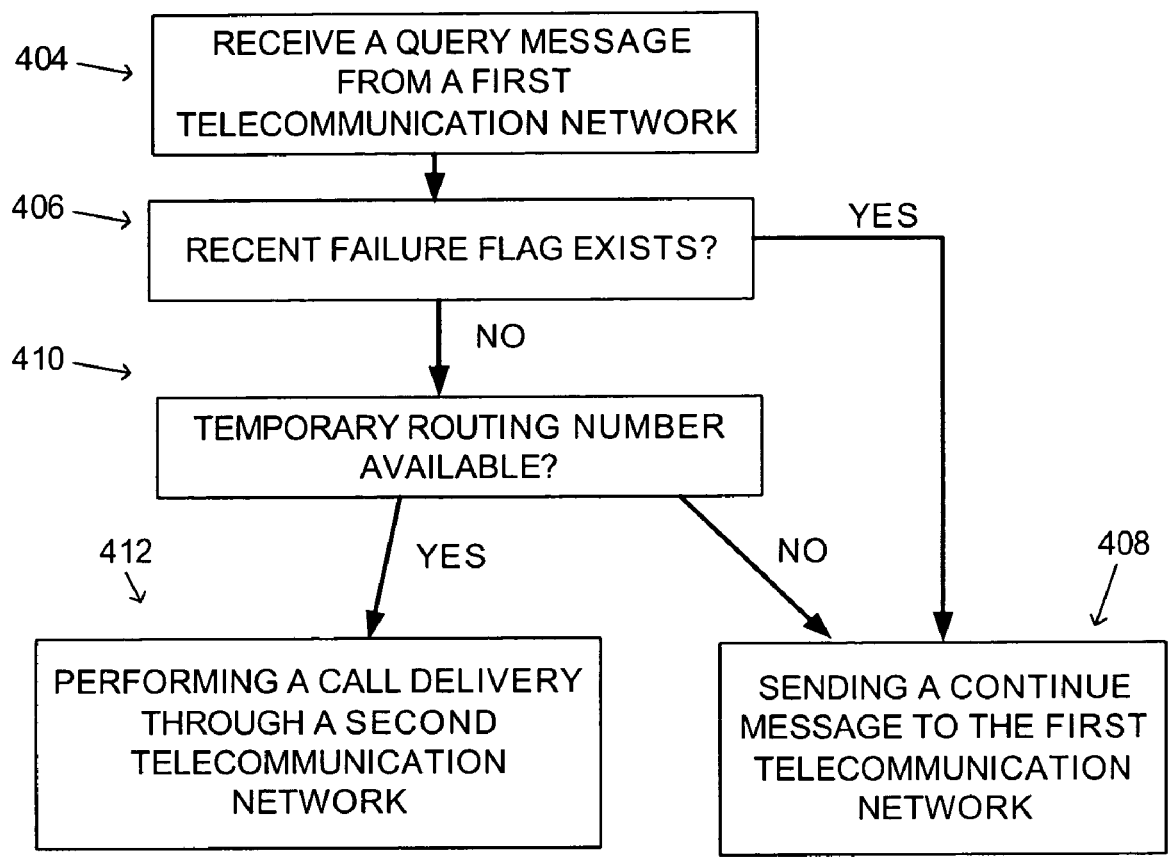
FIG. 4 is a representation of an exemplary logic flow of the network infrastructure device of the apparatus of FIG. 1 during the call delivery of FIG. 2 and the failed call delivery of FIG. 3.

Turning to FIG. 4, a logic flow 402 illustrates exemplary steps performed by the network infrastructure device 105 for the call delivery from the first telecommunication network 102 into the second telecommunication network 104. The service control point component 120 of the network infrastructure device 105 receives (STEP 404) the query message 210 from the mobile switching center 106 of the first telecommunication network 102. The query message 210 comprises the dialed number associated with the mobile communication device. The service control point component 120 sends a query message 212 to the application server component 122. The query message 212 comprises the dialed number associated with the mobile communication device. The application server component 122 of the network infrastructure component 105 checks (STEP 406) for the existence of the recent failure flag associated with the dialed number. The application server component 122 sends (STEP 408) the continue message 314 to the mobile switching center 106 of the first telecommunication network 102 through the service control point 120 if the recent failure flag exists. If the recent failure flag does not exist, the application server component 122 checks (STEP 410) if a temporary routing number is available from the pool of temporary routing numbers. If a temporary routing number is not available, the application server component 122 sends (STEP 408) the continue message 314 to the mobile switching center 106 and the call delivery into the second telecommunication network 104 is canceled, as described above. The network infrastructure device 105 performs (STEP 412) the call delivery of the call through the second telecommunication network 104 if a temporary routing number is available.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. The computer-readable signal-bearing media store software, firmware and/or assembly language for performing one or more portions of one or more embodiments of the invention. Examples of a computer-readable signal-bearing medium for the apparatus 100 comprise the recordable data storage medium 126 of the network infrastructure device 105. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network.

Numerous alternative embodiments of the present invention exist. For example, where the home subscriber server 110 automatically reports registration events of subscribers in the second telecommunication network 104, the application server component 122 would know the registration status of the mobile communication device prior to sending the query message 214. In this embodiment, the application server component 122 determines the registration status of the mobile communication device without sending the query message 214 and receiving the user data acknowledgement message 216. In another embodiment, the application server component 122 performs a poll to the mobile communication device to determine availability for call termination to the mobile device. An exemplary poll to the mobile communication device comprises the OPTIONS request message of the SIP protocol, as will be appreciated by those skilled in the art.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
   a network infrastructure device that comprises a service control point component, an application server component, a first external interface, and a second external interface;
   wherein the service control point component emulates a service control point through the first external interface to communicates with a first telecommunication network through the first external interface, wherein the first telecommunication network comprises a legacy cellular telecommunication network with a home location register;
   wherein the application server component emulates an application server to communicates with a second telecommunication network through the second external interface, wherein the second telecommunication network comprises an IP multimedia subsystem (IMS) telecommunication network with a home subscriber server;
   wherein the service control point component communicates with the application server component through an internal interface;
   wherein the network infrastructure device, the home subscriber server, and the home location register are distinct from each other;
   wherein the network infrastructure device allows a mobile communication device that has a first registration in the first telecommunication network and a second registration in the second telecommunication network to receive, through the second telecommunication network, a call directed to the first registration;
   wherein the home location register of the first telecommunication network maintains the first registration and the home subscriber server of the second telecommunication network maintains the second registration;
   wherein the first telecommunication network is unable to directly query the second telecommunication network for a status of the second registration;
   wherein the service control point component receives a query message from the first telecommunication network through the first external interface and communicates the query message to the application server component through the internal interface;
   wherein the application server component checks for a recent failure flag upon receipt of the query message and sends a continuation message to the first telecommunication network if the recent failure flag exists, wherein the recent failure flag is associated with the call to indicate the failed delivery of the call through the second telecommunication network;
   wherein the application server component obtains the status of the second registration through the second external interface if the recent failure flag does not exist;
   wherein the network infrastructure device employs the status of the second registration to allow the mobile communication device to receive the call directed to the first registration through the second telecommunication network.

2. The apparatus of claim 1, wherein the first telecommunication network comprises a circuit-switched telecommunication network;
   wherein the second telecommunication network comprises a packet-switched telecommunication network;
   wherein the network infrastructure device communicates with the circuit-switched telecommunication network through the first external interface;
   wherein the network infrastructure device communicates with the packet-switched telecommunication network through the second external interface;
   wherein the network infrastructure device allows a mobile communication device that has a first registration in the circuit-switched telecommunication network and a second registration in the packet-switched telecommunication network to receive, through the packet-switched telecommunication network, a call directed to the first registration.

3. The apparatus of claim 2, wherein the circuit-switched telecommunication network and the first external interface are compliant with an ANSI-41 or Mobile Application Part communication protocol;
   wherein the packet-switched telecommunication network and the second external interface are compliant with an Internet Protocol Multimedia Subsystem standard.

4. The apparatus of claim 3, wherein the packet-switched telecommunication network is compliant with a Session Initiation Protocol communication protocol.

5. The apparatus of claim 1, wherein the application server component allocates a temporary routing number associated with the call, the second registration, and the application server component;
   wherein the application server component communicates the temporary routing number to the service control point component through the internal interface;
   wherein the service control point component communicates the temporary routing number to the first telecommunication network to allow the first telecommunication network to deliver the call directed to the first registration to the mobile communication device through the second telecommunication network.

6. The apparatus of claim 5, wherein the application server component receives an indication of a failed delivery of the call through the second telecommunication network;
   wherein the application server component sends a redirect message to the second telecommunication network through the second external interface;
   wherein the application server component sets the recent failure flag;
   wherein the application server component clears the recent failure flag after a pre-determined time interval and/or event.

7. A method, comprising the steps of:
   receiving a query message at a network infrastructure device, for a call to a mobile communication device, from a first telecommunication network through employment of a first network protocol, wherein the first telecommunication network comprises a legacy cellular telecommunication network with a home location register that maintains a first registration status for the mobile communication device in the first telecommunication network; and
   determining, by the network infrastructure device, a second registration status of the mobile communication device in a second telecommunication network through employment of a second network protocol to allow for a call delivery of the call through the second telecommunication network, wherein the first telecommunication network is unable to directly query the second telecommunication network for the registration status, wherein the second telecommunication network comprises an IP multimedia subsystem (IMS) telecommunication network with a home subscriber server that maintains the second registration status for the mobile communication device in the second telecommunication network, wherein the network infrastructure device, the home subscriber server, and the home location register are distinct from each other;
   wherein the step of determining the second registration status comprises the steps of:
   checking for an existence of a recent failure flag associated with the failed delivery of the call through the second telecommunication network;
   sending a continuation message to the first telecommunication network if the recent failure flag exists; and
   determining the registration status of the mobile communication device in the second telecommunication network if the recent failure flag does not exist.

8. The method of claim 7, further comprising the step of:
   sending a reply message to the first telecommunication network to initiate the delivery of the call through the second telecommunication network.

9. The method of claim 8, wherein the step of directing the call from the first telecommunication network through the second telecommunication network comprises the steps of:
   allocating a temporary routing number for the call; and
   communicating the temporary routing number to the first telecommunication network through employment of the first network protocol.

10. The method of claim 7, further comprising the step of:
   receiving a failure indication for the delivery of the call through the second telecommunication network;
   sending a redirect message to the second telecommunication network through employment of the second network protocol;
   setting the recent failure flag associated with the failed delivery of the call through the second telecommunication network; and
   clearing the recent failure flag after a pre-determined time interval and/or event.

11. A method, comprising the steps of:
   receiving, at a service control point component of a network infrastructure device, a first query message from a mobile switching center of a legacy cellular network through employment of a legacy network protocol of the legacy cellular network, wherein the first query message comprises a dialed number associated with a call to a mobile communication device that is registered in the legacy cellular network, wherein the first query message is based on an advanced termination trigger at a home location register of the legacy cellular network;
   sending, from the service control point component, a second query message that comprises the dialed number to an application server component of the network infrastructure device;
   checking, at the application server component, for an existence of a recent failure flag associated with the dialed number upon receipt of the second query message;
   checking, at the application server component, if a temporary routing number is available;
   sending, from the application server component, a continue message to the mobile switching center of the legacy cellular network through the service control point component, if the recent failure flag exists or the temporary routing number is not available, to cause a routing of the call through the legacy cellular network; and
   performing, at the application server component, a call delivery of the call to the mobile communication device through an Internet Protocol Multimedia Subsystem network if the recent failure flag does not exist and the temporary routing number is available, wherein the Internet Protocol Multimedia Subsystem network comprises a home subscriber server which is distinct from the home location register and maintains a second registration of the mobile communication device, wherein the network infrastructure device, the home subscriber server, and the home location register are distinct from each other;
   wherein the step of performing the call delivery comprises the steps of:
   setting, at the application server component, a recent failure flag associated with the mobile communication device upon receipt of an indication of a failed delivery of the call from the interrogating call session control function;

clearing, at the application server component, the recent failure flag after a pre-determined event; and sending, from the application server component, a redirect message that comprises the dialed number to the interrogating call session control function.

12. The method of claim 11, wherein the step of performing, at the application server component, the delivery of the call to the mobile communication device through the Internet Protocol Multimedia Subsystem network if the recent failure flag does not exist comprises the steps of:

sending, from the application server component, a third query message that comprises the dialed number to the home subscriber server of the Internet Protocol Multimedia Subsystem network through employment of an Internet Protocol network protocol of the Internet Protocol Multimedia Subsystem network;

receiving, at the application server component, a registration status associated with the mobile communication device from the home subscriber server;

sending, from the application server component, the continue message to the mobile switching center of the legacy cellular network through the service control point component if the registration status indicates that the mobile communication device is unavailable through the Internet Protocol Multimedia Subsystem network; and performing, at the application server component, the delivery of the call to the mobile communication device through the Internet Protocol Multimedia Subsystem network if the registration status indicates that the mobile communication device is available through the Internet Protocol Multimedia Subsystem network.

13. The method of claim 12, wherein the step of performing, at the application server component, the delivery of the call to the mobile communication device through the Internet Protocol Multimedia Subsystem network if the registration status indicates that the mobile communication device is available through the Internet Protocol Multimedia Subsystem network comprises the steps of:

allocating, by the application server component, a temporary routing number, from a pool of temporary routing numbers, for the call to the mobile communication device;

associating, by the application server component, the temporary routing number with a public user ID associated with the mobile communication device;

sending, from the application server component, the temporary routing number to the service control point component;

sending, from the service control point component, a trigger result message that comprises the temporary routing number to the mobile switching center of the legacy cellular network;

receiving, at the application server component, a first invite message from an interrogating call session control function, wherein the invite message comprises the temporary routing number;

sending, from the application server component, a second invite message to the interrogating call session control function, wherein the second invite message comprises the public user ID associated with the mobile communication device; and releasing, by the application server component, the temporary routing number to the pool of temporary routing numbers.

14. The method of claim 11, wherein the step of clearing, at the application server component, the recent failure flag after the pre-determined event comprises the step of:

starting a timer upon an event;

clearing the recent failure flag, at the application server component, after an expiration of the timer.

* * * * *